3,028,249
ASPHALTIC COMPOSITIONS

Arnold J. Hoiberg, Montville, N.J., assignor to Monsanto Chemical Company, St. Louis, Mo., a corporation of Delaware
No Drawing. Filed Aug. 25, 1958, Ser. No. 757,090
8 Claims. (Cl. 106—273)

This invention relates to asphalts and more particularly to asphaltic compositions.

Asphalts have become widely used coating materials. They are primarily used for coatings for road surfaces, protective coatings for metal surfaces and as roofing compositions. The use of these materials has advanced steadily as means were found to further increase their performance characteristics. For example, an important characteristic of any coating composition is its adhesive qualities—its ability to firmly adhere to the surface to be coated. Some years ago it was discovered that the adhesive qualities of an asphalt could be improved by incorporating therewith a small amount of an amine. The adhesive qualities of the asphalt were enhanced without any significant sacrifice in other desirable properties. This is but one example of enhancing the physical properties and performance characteristics of an asphalt through the use of additives.

Asphalt can also be modified by processing techniques. This is exemplified by the rather recent development of what is called catalytically air-blown asphalt. This process comprises air-blowing asphalt in the presence of a phosphorus containing catalyst selected from the group consisting of the stable acids of phosphorus, such as orthophosphoric acid and pyrophosphoric acid, phosphorus pentoxide, red phosphorus, and the stable sulfides of phosphorus, such as phosphorus sesquisulfide, phosphorus sulfide and phosphorus pentasulfide. The blowing is carried out at an elevated temperature and preferably within the range of from about 400° to 550° F. for the time required to effect the desired change in physical properties which can vary anywhere from about 30 minutes to about five to eight hours depending upon the characteristics of the base being blown. The asphalts produced by this technique are characterized by higher than normal penetration values at a given softening point and as a result find use in applications in which the usual untreated asphalts have no commercial utility.

Even with these advancements in asphalt technology, further improvements are desired and improvements in the properties of catalytically air-blown asphalt appear most profitable due to the already enhanced characteristics of the asphalt base realized through the processing technique. The use of additives in such asphalts as a means of further upgrading them offers a field for investigation and here it was found that the action of additives in the more conventional asphalts was totally different from the action of additives in catalytically air-blown asphalt. There is little in the art on the behavior of additives in such asphalts as these.

It is an object of this invention to provide improved asphalts. Particularly, it is an object of this invention to provide improved catalytically air-blown asphalts. A further object of this invention is to increase the softening point of catalytically air-blown asphalts through the use of an additive. Additional objects will become apparent from the description of the invention.

It has now been discovered that it is possible to increase the softening point of catalytically air-blown asphalt without materially affecting the penetration characteristics of the asphalt. This is accomplished through the addition of an organic amine. Thus the novel compositions of this invention comprise an asphalt having incorporated therein a minor amount of an organic amine, said asphalt having been air-blown at an elevated temperature in the presence of a phosphorus containing catalyst selected from the group consisting of the stable acids of phosphorus, phosphorus pentoxide, red phosphorus and the stable sulfides of phosphorus. The following examples illustrate this invention:

EXAMPLE I

A Smackover asphalt having a peneration of 90 mm./10 at 77° F. (ASTM test D–5–52) was blown in the presence of 0.5% by weight $P_2O_5$ to a softening point of 169° F. (ASTM test D–36–26). The resultant catalytic air-blown asphalt was mixed with various amines and the resultant compositions evaluated as shown in Table A.

*Table I*

| Amine | Percent by weight of added amine | Softening Point, °F. | Penetration, mm./ 10 at 77° F. |
|---|---|---|---|
| none | 0.0 | 169 | 28 |
| β-aminoethyl-β-hydroxyethyl-amine | 0.5 | 178 | 28 |
| Do. | 1.0 | 180 | 27 |
| (¹) | 1.0 | 175 | 29 |
| (²) | 1.0 | 174 | 29 |
| cyclohexylamine | 1.0 | 174 | 28 |

[1] A mixture of primary amines comprising approximately 30% hexadecylamine, 25% octadecylamine, 45% octadecenylamine.
[2] A mixture of primary amines containing from eight to eighteen carbon atoms and containing approximately 50% dodecylamine.

EXAMPLE II

Smackover flux having a 114 sec. float at 122° F. (ASTM test D–139–49) is air-blown in the presence of 1.0% $P_2O_5$ to a softening point of 179° F. The resultant catalytic air-blown asphalt was then mixed with various amines and the resultant compositions evaluated as shown in Table B.

*Table B*

| Amine | Percent by weight of added amine | Softening Point, °F. | Penetration, mm./ 10 at 77° F. |
|---|---|---|---|
| none | 0.0 | 179 | 75 |
| β-aminoethyl-β-hydroxyethyl-amine | 1.0 | 230 | 63 |
| (²) See Note (²) Table A | 1.0 | 192 | 76 |
| cyclohexylamine | 0.5 | 190 | 71 |
| Do. | 1.0 | 197 | 72 |

Examples I and II clearly illustrate the improved characteristics of the novel compositions of this invention. It is to be noted that in each case the softening point of the asphalt was increased significantly without any significant change in the penetration values of the asphalt. That this effect of the amines is manifested only in catalytic air-blown asphalts is demonstrated in Example III.

EXAMPLE III

A Smackover flux having a 115 sec. float at 122° F. was air-blown in the absence of a catalyst to a softening point of 202° F. Varying quantities of an amine corresponding to the composition set forth in note (2) of Table A were added to the asphalt and the resultant softening points determined with the following results.

Table C

| Percent amine added: | Softening point, ° F. |
|---|---|
| 0.0 | 202 |
| 1.0 | 200 |
| 2.0 | 198 |

The addition of the amine to this asphalt did not result in an increase in softening point.

A Smackover flux having 35 sec. float at 122° F. was air-blown in the presence of 1.0% $P_2O_5$ to a softening point of 141° F. Varying quantities of the same amine specified in the preceding paragraph were added to the asphalt and the resultant softening points determined with the following results.

Table D

| Percent amine added: | Softening point, ° F. |
|---|---|
| 0.0 | 141 |
| 1.0 | 195 |

The utility of the amine additives is also manifested in cutback asphalts. Here its action results in a significant increase in the viscosity of the mixture as shown in Example IV.

EXAMPLE IV

A Smackover asphalt was air-blown in the presence of 1.0% $P_2O_5$ to a softening point of 230° F. and a penetration of 20 mm./10 at 77° F. A cutback was prepared consisting of 52% by weight of this asphalt and 48% by weight of naphtha having a boiling range of 306°–360° F. The cutback had a viscosity of 76 Saybolt Furol seconds at 122° F. To this cutback was added varying quantities of various amines with the following results:

Table E

| Amine | Percent Amine Added | Saybolt Furol Viscosity, sec. |
|---|---|---|
| none | 0.0 | 76 at 122° F. |
| amylamine | 1.0 | 121 at 140° F. |
| tert-amylamine | 1.0 | 157 at 122° F. |
| n-octylamine | 1.0 | 143 at 180° F. |
| diethylenetriamine | 1.0 | 453 at 180° F. |
| β-aminoethyl-β-hydroxyethylamine | 1.0 | Too heavy to be determined at 180° F. |
| (²) See Note (²) Table A | 3.0 | 1,005 at 180 ° F. |
| cyclohexylamine | 1.0 | 151 at 180° F. |
| phenyl-hydroxyethylamine | 1.0 | 271 at 122° F. |
| tert.-amylaniline | 1.0 | 157 at 122° F. |

Here again, the action appears to be specific to catalytic air-blown asphalt. This is shown in Example V.

EXAMPLE V

Shuler asphalt having a penetration of 190 mm./10 at 77° F. was air-blown in the absence of a catalyst to a softening point of 210° F. and a penetration of 15 mm./10 at 77° F. A cutback was prepared using equal portions (by weight) of this asphalt and naphtha having a boiling range of 306°–360° F. The cutback had a viscosity of 170 Saybolt Furol seconds at 77° F. An amine as described in note (2) of Table A was added to the cutback in the amount of 1% and 3% by weight. The cutback containing 1% by weight of amine had a viscosity of 170 Saybolt Furol seconds at 77° F. and the cutback containing 3% by weight of the amine had a viscosity of 175 Saybolt Furol seconds at 77° F. Thus on a cutback prepared from non-catalytic air-blown asphalt, the amine had no appreciable effect.

Any organic amine can be used in the practice of this invention. Primary, secondary and tertiary amines; saturated and unsaturated amines; substituted and unsubstituted amines; monoamines and polyamines are all operable. Specific examples of amines which can be used are methylamine, ethylamine, diethylamine, triethylamine, isopropylamine, ethylmethylamine, tert. butylamine, amylamine, vinylamine, ethanolamine, diethanolamine, triethanolamine, ethyl-β-hydroxyethylamine, β-chloroethylamine, β-hydroxypropylamine, aniline, benzylamine, diphenylamine, di-tert.-butylamine, laurylamine, myristylamine, certylamine, stearylamine, ethyllaurylamine, ethylenediamine, diethylenetriamine, aminodiphenyl, hexamethylenediamine, etc. Particularly preferred in the practice of this invention are those amines represented by the formula

wherein $R_1$ and $R_2$ represent H and a radical selected from the group consisting of cycloalkyl radicals, alkyl radicals containing from 1 to 30 carbon atoms and hydroxy, amino and halogen substituted alkyl radicals containing from 1 to 30 carbon atoms and $R_3$ represents a radical selected from the group consisting of cycloalkyl radicals, alkyl radicals containing from 1 to 30 carbon atoms and hydroxy, amino and halogen substituted alkyl radicals containing from 1 to 30 carbon atoms.

The concentration of the amine in the asphalt can be varied substantially. Concentrations varying from 0.05% to about 10% by weight of total composition can be used. An amine content of from about 0.1% to about 5% is particularly preferred. The amine can be intimately dispersed in the asphalt by any convenient method. Simple mixing at an elevated temperature is usually adequate.

The catalytic air-blown asphalt used in the practice of this invention is prepared by the method hereinbefore described. This method is amplified and exemplified in U.S. Patent 2,450,756.

The asphaltic compositions of this invention have widespread utility. They are ideally suited for coating road surfaces, for coating metallic surfaces and for use as roofing compositions. Fillers and other modifiers can be incorporated therein if desired. The compositions can be applied by spraying, spreading, dipping, painting, etc. In practically every application, their performance is superior to the unmodified catalytic air-blown asphalts.

What is claimed is:

1. An asphaltic composition consisting essentially of (1) an asphalt obtained by air-blowing an asphalt in the presence of a phosphorus containing catalyst selected from the group consisting of the stable acids of phosphorus, phosphorus pentoxide, red phosphorus and the stable sulfides of phosphorus at an elevated temperature and (2) from about 0.05% to about 10% by weight of total composition of an organic amine represented by the formula

wherein $R_1$ and $R_2$ represent hydrogen and a radical selected from the group consisting of cycloalkyl radicals containing not more than 6 carbon atoms, alkyl radicals containing from 1 to 30 carbon atoms and hydroxy, amine and halogen substituted alkyl radicals containing from 1 to 30 carbon atoms and $R_3$ represents a radical selected from the group consisting of cycloalkyl radicals containing not more than 6 carbon atoms, alkyl radicals containing from 1 to 30 carbon atoms and hydroxy, amine and halogen substituted alkyl radicals containing from 1 to 30 carbon atoms.

2. An asphaltic composition as described in claim 1, wherein the organic amine is present in an amount in the range of from about 0.1% to about 5% by weight of total composition.

3. An asphaltic composition as described in claim 1 wherein the asphalt is air-blown in the presence of phosphorus pentoxide.

4. An asphaltic composition as described in claim 3 wherein the amine is cyclohexylamine.

5. An asphaltic composition as described in claim 3 wherein the amine is β-aminoethyl-β-hydroxyethylamine.

6. An asphaltic composition as described in claim 3 wherein the amine is diethylenetriamine.

7. An asphaltic composition as described in claim 3 wherein the amine is n-octylamine.

8. An asphaltic composition as described in claim 3 wherein the amine is amylamine.

References Cited in the file of this patent

UNITED STATES PATENTS

| | | |
|---|---|---|
| 2,450,756 | Hoiberg | Oct. 5, 1948 |
| 2,508,924 | Mertens | May 23, 1950 |
| 2,534,713 | Hankins | Dec. 19, 1950 |
| 2,582,823 | Fowkes | Jan. 15, 1952 |
| 2,676,910 | Edson | Apr. 27, 1954 |
| 2,797,169 | Mertens | June 25, 1957 |